(12) United States Patent
Jia et al.

(10) Patent No.: US 11,975,967 B1
(45) Date of Patent: May 7, 2024

(54) DEVICE FOR HYDROGEN PRODUCTION FROM WATER PHOTOLYSIS AND METHOD THEREFOR

(71) Applicant: Institute of Process Engineering, Chinese Academy of Sciences, Beijing (CN)

(72) Inventors: Qibo Jia, Beijing (CN); Dongping Duan, Beijing (CN); Xiaodong Zhang, Beijing (CN); Ke Gan, Beijing (CN); Yan Li, Beijing (CN); Yuzhi Ren, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/399,907

(22) Filed: Dec. 29, 2023

(30) Foreign Application Priority Data

May 10, 2023 (CN) .......................... 202310517872.4

(51) Int. Cl.
*C01B 3/00* (2006.01)
*B01J 19/12* (2006.01)
(Continued)

(52) U.S. Cl.
CPC ............. *C01B 3/042* (2013.01); *B01J 19/123* (2013.01); *B01J 21/063* (2013.01); *B01J 23/002* (2013.01);
(Continued)

(58) Field of Classification Search
None
See application file for complete search history.

(56) References Cited

U.S. PATENT DOCUMENTS

2023/0096060 A1    3/2023    Masuda et al.

FOREIGN PATENT DOCUMENTS

CN    101033058 A    9/2007
CN    101974764 A    2/2011
(Continued)

OTHER PUBLICATIONS

FR-2895392-A1, English translation (Year: 2007).*
(Continued)

*Primary Examiner* — Stefanie J Cohen
(74) *Attorney, Agent, or Firm* — George R. McGuire

(57) ABSTRACT

Provided are a device for hydrogen production from water photolysis and a method therefor, which belongs to the field of photocatalytic solar hydrogen production. The device for hydrogen production from water photolysis comprises: a catalytic reaction unit for water photolysis comprising a light-transmitting surface, and a light condenser component with a light-concentrating surface facing the light-transmitting surface of the catalytic reaction unit for water photolysis; the light condenser component comprises a solar concentrating cone and a reflector for reflecting and concentrating sunlight into the solar concentrating cone. In the present application, from the perspective of improving the utilization efficiency of sunlight, the device for hydrogen production from water photolysis is designed, which utilizes the light condenser component to concentrate solar energy into the catalytic reaction unit for water photolysis, greatly improving the light intensity and catalytic efficiency, and greatly simplifying the catalytic interface and reaction unit for water photolysis.

9 Claims, 1 Drawing Sheet

(51) Int. Cl.
    *B01J 21/06*     (2006.01)
    *B01J 23/00*     (2006.01)
    *B01J 23/02*     (2006.01)
    *B01J 23/889*     (2006.01)
    *B01J 35/39*     (2024.01)
    *B01J 37/03*     (2006.01)
    *B01J 37/04*     (2006.01)
    *B01J 37/08*     (2006.01)
    *C01B 3/04*     (2006.01)

(52) U.S. Cl.
    CPC .......... *B01J 23/02* (2013.01); *B01J 23/8896* (2013.01); *B01J 35/39* (2024.01); *B01J 37/031* (2013.01); *B01J 37/04* (2013.01); *B01J 37/08* (2013.01); *C01B 2203/0277* (2013.01); *C01B 2203/0855* (2013.01); *C01B 2203/1041* (2013.01); *C01B 2203/1064* (2013.01); *C01B 2203/1282* (2013.01)

(56) References Cited

FOREIGN PATENT DOCUMENTS

| | | | |
|---|---|---|---|
| CN | 107540045 A | 1/2018 | |
| CN | 109987581 A | 7/2019 | |
| CN | 112604678 A | 4/2021 | |
| CN | 112723409 A | 4/2021 | |
| CN | 114873637 A | 8/2022 | |
| CN | 115869935 A | 3/2023 | |
| CN | 115893483 A | 4/2023 | |
| FR | 2895392 A1 * | 6/2007 | ............ B01J 19/127 |
| JP | 2019156705 A | 7/2019 | |
| JP | 2019156705 A * | 9/2019 | |

OTHER PUBLICATIONS

JP-2019156705-A, English translation (Year: 2019).*
Translated Chinese First Office Action, App. No. 202310517872.4, dated Jun. 10, 2023, pp. 1-27.
Translated Chinese Second Office Action, App. No. 202310517872.4, dated Jul. 10, 2023, pp. 1-6.

* cited by examiner

DEVICE FOR HYDROGEN PRODUCTION FROM WATER PHOTOLYSIS AND METHOD THEREFOR

CROSS-REFERENCE TO RELATED APPLICATION(S)

This application claims priority to Chinese Patent Application No. 202310517872.4 filed May 10, 2023 the disclosure of which is incorporated herein by reference in its entirety.

TECHNICAL FIELD

The present application belongs to the field of photocatalytic solar hydrogen production, and specifically relates to a device for hydrogen production from water photolysis and a method therefor.

BACKGROUND

As a green, pollution-free, high-efficiency energy source, hydrogen is an ideal choice of new energy in the future. With years of development and long-term efforts, extensive researches and practices have been conducted in the fields of hydrogen production, hydrogen storage, hydrogen transportation and terminal applications. Photocatalytic overall water splitting is an emerging, environmental-friendly and low-carbon technology for green hydrogen production.

In recent decade, a new method of overall water splitting for hydrogen production, semiconductor-based photocatalytic hydrogen production, has attracted more and more attention from workers in the energy field because of its unique application mode and its characteristics of only utilizing natural energy, the sunlight. In the method of photocatalytic overall water splitting for hydrogen production, light energy is converted into chemical energy by using the physical properties of semiconductors, and the water molecules are completely split into hydrogen and oxygen under relatively mild conditions without pollution, which has incomparable advantages compared with other hydrogen production methods such as water electrolysis and photovoltaic-water electrolysis. In 1972, the research results of splitting water by light on the TiO2 electrode opened the door for researchers to the world of photocatalysis. Henceforth, researchers in various fields such as chemistry, physics and materials have conducted extensive researches on semiconductor materials and special crystal materials in the conversion and storage of solar energy, photochemical synthesis, water photolysis for hydrogen production and photocatalytic degradation.

At present, the solar-to-hydrogen conversion efficiency is generally low in the hydrogen production from water photolysis, and the hydrogen production reactor is mostly designed as a planar structure, such as thin films and coatings. For example, CN106521546A discloses a multi-layer composite film electrode material for hydrogen production by photolysis of water and a preparation method therefor. According to the ultraviolet-visible spectral characteristics and interface effects of BiVO4 and CuWO4, a multi-layer composite structure is designed in this patent, and a multi-layer film is prepared by using sol-gel method and dip coating process, and the response range of the prepared multi-layer composite film for visible light is significantly broadened and adjustable. CN109023284B discloses a composite multi-layer film material with optical characteristics and rectification effect and a preparation method therefor. The composite multi-layer film material comprises CuCrO2 films and CuO films arranged alternately; one layer of CuCrO2 film and one layer of CuO film which are arranged alternately are a cycle, and there are 6-14 cycles in the alternate arrangement; a thickness ratio of the CuCrO2 film to the CuO film is 1:2. However, the interfacial energy of sunlight received by such structure is low, a unit area can only absorb one solar irradiance, the gas production is slow, and the cost is high. Therefore, the efficiency of hydrogen production and the solar-to-hydrogen conversion efficiency are low, which seriously restricts the popularization and application of this technology.

In addition to designing the hydrogen production component by water photolysis into a planar structure, the hydrogen production from photocatalytic water splitting can also be carried out with porous materials as a medium. For example, CN114349100A discloses a device for hydrogen production-power generation-seawater desalination co-production by solar energy, comprising a condenser lens, a spectroscope, a solar power generation device, a reaction chamber, a honeycomb activated carbon, a gas storage device and a fresh water collection device. The spectroscope is located at a focal point of the condenser lens, and a part of the sunlight is reflected to the solar power generation device, and the other part of the sunlight is transmitted through the spectroscope and irradiates to the honeycomb activated carbon, wherein a catalyst for photocatalytic water splitting is attached to the honeycomb activated carbon for catalyzing water splitting. However, the amount of catalyst loaded by the honeycomb activated carbon medium in this scheme is small, and the light cannot all penetrate the activated carbon medium to reach the surface of the catalyst, resulting in a very low utilization efficiency of light.

Therefore, it is an urgent technical problem to be solved how to effectively improve the efficiency of solar-to-hydrogen conversion.

SUMMARY

In view of the shortcomings of the prior art, an object of the present application is to provide a device for hydrogen production from water photolysis and a method therefor. In the present application, from the perspective of improving the utilization efficiency of sunlight, a device for hydrogen production from water photolysis is designed, which utilizes a light condenser component to concentrate solar energy into a catalytic reaction unit for water photolysis, greatly improving the light intensity, and the structure is simple, and the device can be applied to various climates and various light conditions. Moreover, the reaction for hydrogen production and oxygen production can be efficiently performed by the device, which has an excellent solar-to-hydrogen conversion efficiency.

To achieve the object, the present application adopts the technical solutions below.

In a first aspect, the present application provides a device for hydrogen production from water photolysis, and the device for hydrogen production from water photolysis comprises:

- a catalytic reaction unit for water photolysis comprising a light-transmitting surface, and
- a light condenser component with a light-concentrating surface facing the light-transmitting surface of the catalytic reaction unit for water photolysis;
- the light condenser component comprises a solar concentrating cone and a reflector for reflecting and concentrating sunlight into the solar concentrating cone.

In the present application, from the perspective of improving the utilization efficiency of sunlight, a device for hydrogen production from water photolysis is designed, which utilizes the light condenser component to concentrate solar energy into the catalytic reaction unit for water photolysis, greatly improving the light intensity and catalytic efficiency, greatly simplifying the catalytic interface and reaction unit for water photolysis, and the structure is simple, and the device can be applied to various climates and various light conditions. Moreover, the reaction for hydrogen production and oxygen production can be efficiently performed by the device, which has an excellent solar-to-hydrogen conversion efficiency.

Those skilled in the field should understand that the catalytic reaction unit for water photolysis comprising a light-transmitting surface in the present application must be provided with a catalyst for hydrogen production from water photolysis, which is used in photocatalytic water splitting for hydrogen production.

As a preferred technical solution of the present application, the solar concentrating cone is arranged directly above the catalytic reaction unit for water photolysis.

In the present application, a distance between the solar concentrating cone and the catalytic reaction unit for water photolysis is not specifically limited, as long as the desired intensity of concentrated light and the catalytic efficiency can be achieved, and the light spot size is consistent with a size of the light-transmitting surface.

Preferably, the solar concentrating cone comprises a condenser lens.

As a preferred technical solution of the present application, reflectors are uniformly arranged around the catalytic reaction unit for water photolysis.

Preferably, the number of the reflectors is 10-100000, which can be, for example, 10, 100, 200, 300, 400, 500, 600, 700, 800, 900, 1000, 1000, 3000, 4000 or 100000, etc. However, the number of the reflectors is not limited to the listed values, and other unlisted values within the numerical range are also applicable.

In the present application, by adding 10-100000 reflectors, a light intensity of the concentred sunlight is 10-100000 times the standard solar intensity, greatly improving the light intensity and catalytic efficiency, and greatly simplifying the catalytic interface and reaction unit for water photolysis, which is conducive to efficient hydrogen production.

As a preferred technical solution of the present application, the catalytic reaction unit for water photolysis comprises a water photolysis reactor.

In the present application, an inner wall of the water photolysis reactor is not limited, and exemplarily, the inner wall of the water photolysis reactor can be covered with an aluminum foil; a size of the water photolysis reactor is not limited, exemplarily, which can be a reactor with a light-receiving area of 6×6 cm2, or a reactor with a light-receiving surface having a diameter of 1-2 m.

Preferably, the water photolysis reactor has an integrated structure, at least one side of inner wall of the water photolysis reactor is embedded with a catalyst for hydrogen production from water photolysis, and preferably, a top of the inner wall of the water photolysis reactor is embedded with a catalyst for hydrogen production from water photolysis;

alternatively, the water photolysis reactor comprises a container with an opening at the top and a light-transmitting cover arranged at the opening, and at least one side of inner wall of the container or an inner surface of the light-transmitting cover close to the container is embedded with a catalyst for hydrogen production from water photolysis.

Preferably, a material of the light-transmitting cover is quartz glass.

As a preferred technical solution of the present application, an outer side wall of the catalytic reaction unit for water photolysis is provided with a gas vent, a water inlet and a observing port, and the gas vent is higher than the water inlet.

Preferably, the gas vent is connected with a gas separation device by a pipe, and the water inlet is connected with water source by a pipe.

As a preferred technical solution of the present application, an inside of the catalytic reaction unit for water photolysis is provided with a water nozzle which is connected with the water inlet, so that the water is sprayed onto a surface of the light-transmitting cover close to the catalytic reaction unit for water photolysis.

In the present application, an object of spraying water onto the surface of the light-transmitting cover close to the catalytic reaction unit for water photolysis is to utilize the light-transmitting cover loaded with the catalyst, fully improving the light-to-hydrogen conversion efficiency of the reactor.

As a preferred technical solution of the present application, a stirrer is arranged at the bottom of the catalytic reaction unit for water photolysis.

As a preferred technical solution of the present application, the catalyst for hydrogen production from water photolysis comprises a polyhedral strontium titanate catalyst and/or a polyhedral strontium titanate composite catalyst.

It should be noted that the polyhedral strontium titanate catalyst refers to a pure polyhedral strontium titanate catalyst, which only contains polyhedral strontium titanate without a co-catalyst; the polyhedral strontium titanate composite catalyst is composed of polyhedral strontium titanate and a co-catalyst.

A perovskite-type strontium titanate ($SrTiO_3$) crystal has suitable energy band structure, excellent high-temperature resistance and high ultraviolet absorption efficiency, and has extremely high photon utilization efficiency and photoelectric conversion efficiency in the ultraviolet wavelength band, which is one of the materials for hydrogen production from water photolysis.

Preferably, the polyhedral strontium titanate catalyst comprises an octadecahedron strontium titanate catalyst and/or a polyhedron strontium titanate catalyst having twenty-six faces.

Preferably, the polyhedral strontium titanate composite catalyst is loaded with an Rh metal compound, a Co metal compound and a Cr metal compound as a co-catalyst.

In the present application, the polyhedral strontium titanate in the polyhedral strontium titanate composite catalyst is loaded with a co-catalyst as an active site, which can further broaden the visible light absorption range, improve the separation efficiency of photogenerated electrons and holes, and improve the efficiency of hydrogen production and oxygen production.

Preferably, the Rh metal compound comprises rhodium chloride, the Co metal compound comprises cobalt nitrate, and the Cr metal compound comprises potassium chromate.

Preferably, the polyhedral strontium titanate composite catalyst comprises an octadecahedron strontium titanate composite catalyst and/or a polyhedron strontium titanate composite catalyst having twenty-six faces.

As a preferred technical solution of the present application, a preparation method for the polyhedral strontium titanate composite catalyst comprises the following steps:

(1) mixing strontium titanate and strontium halide, and performing heat treatment to obtain a polyhedral strontium titanate catalyst; and (2) preparing the polyhedral strontium titanate composite catalyst by using stepwise photodeposition method, and specific steps of the stepwise photodeposition method comprise:

(a) mixing a rhodium source and the polyhedral strontium titanate catalyst in a solvent, and performing irradiation to obtain a first mixture;

(b) mixing a chromium source and the first mixture, and performing irradiation to obtain a second mixture;

(c) mixing a cobalt source and the second mixture, and performing irradiation to obtain a third mixture; and (d) subjecting the third mixed solution to heat treatment to obtain the polyhedral strontium titanate composite catalyst.

As a preferred technical solution of the present application, in step (1), the strontium titanate and the strontium halide have a mass ratio of 1:(2-6), which can be, for example, 1:2, 1:2.5, 1:3, 1:3.5, 1:4, 1:4.5, 1:5, 1:5.5 or 1:6, etc. However, the mass ratio is not limited to the listed values, and other unlisted values within the numerical range are also applicable.

Preferably, the strontium halide in step (1) comprises any one or a combination of at least two of strontium chloride, strontium bromide or strontium iodide.

Preferably, the heat treatment in step (1) is performed at a temperature of 800-1200° C., which can be, for example, 800° C., 850° C., 900° C., 950° C., 980° C., 1000° C., 1020° C., 1050° C., 1100° C., 1150° C. or 1200° C., etc. However, the temperature is not limited to the listed values, and other unlisted values within the numerical range are also applicable.

Preferably, the heat treatment in step (1) is performed for a period of 5-10 h, which can be, for example, 5 h, 6 h, 7 h, 8 h, 9 h or 10 h, etc. However, the period is not limited to the listed values, and other unlisted values within the numerical range are also applicable.

As a preferred technical solution of the present application, the solvent in step (a) comprises water.

Preferably, the rhodium source in step (a) comprises rhodium chloride.

Preferably, the chromium source in step (b) comprises potassium chromate.

Preferably, the cobalt source in step (c) comprises cobalt nitrate.

Preferably, concentrations of aqueous solutions of the rhodium source, the chromium source and the cobalt source are independently 2-4 mg/mL, for example, 2 mg/mL, 2.2 mg/mL, 2.4 mg/mL, 2.6 mg/mL, 2.8 mg/mL, 3 mg/mL, 3.2 mg/mL, 3.4 mg/mL, 3.6 mg/mL, 3.8 mg/mL or 4 mg/mL, etc. However, the concentrations are not limited to the listed values, and other unlisted values within the numerical range are also applicable.

It should be noted that, in the present application, the term "independently" means that the rhodium source in the aqueous solution has a concentration of 2-4 mg/mL, the chromium source in the aqueous solution has a concentration of 2-4 mg/mL, and the cobalt source in the aqueous solution has a concentration of 2-4 mg/mL; the concentrations of the three do not affect each other, which may be the same concentration or different concentrations. The "independently" used hereinafter is construed in the similar way as used here.

Preferably, the aqueous solutions of the rhodium source, the chromium source and the cobalt source have a volume ratio of (10-50): (10-20): (10-20), wherein a selection range of the aqueous solution of the rhodium source is "10-50", which can be, for example, 10, 20, 30, 40 or 50, etc., a selection range of the aqueous solution of the chromium source is "10-20", which can be, for example, 10, 12, 14, 16, 18 or 20, etc., and a selection range of the aqueous solution of the cobalt source is "10-20", which can be, for example, 10, 12, 14, 16, 18 or 20, etc. However, the volume ratio is not limited to the listed values, and other unlisted values within the numerical range are also applicable.

Preferably, the mixing in step (a), the mixing in step (b) and the mixing in step (c) are accompanied by stirring.

Preferably, a manner of the mixing in step (a) comprises: dispersing the polyhedral strontium titanate catalyst in water to obtain a dispersion solution, and mixing the dispersion solution and the rhodium source.

Preferably, the dispersion solution has a concentration of 0.05-0.15 mg/mL, which can be, for example, 0.05 mg/mL, 0.07 mg/mL, 0.09 mg/mL, 0.11 mg/mL, 0.13 mg/mL or 0.15 mg/mL, etc. However, the concentration is not limited to the listed values, and other unlisted values within the numerical range are also applicable.

Preferably, a light source for the irradiation in step (a), the irradiation in step (b) and the irradiation in step (c) are xenon lamps.

Preferably, the irradiation in step (a), the irradiation in step (b) and the irradiation in step (c) are independently performed for a period of 5-10 min, which can be, for example, 5 min, 6 min, 7 min, 8 min, 9 min or 10 min, etc. However, the period is not limited to the listed values, and other unlisted values within the numerical range are also applicable.

Preferably, the heat treatment in step (d) comprises primary heating and secondary heating.

Preferably, a manner of the primary heating comprises water-bath heating.

Preferably, the primary heating is performed at a temperature of 50-90° C., which can be, for example, 50° C., 60° C., 70° C., 80° C. or 90° C., etc. However, the temperature is not limited to the listed values, and other unlisted values within the numerical range are also applicable.

Preferably, an atmosphere of the secondary heating is an air atmosphere.

Preferably, the secondary heating is performed at a temperature of 350-550° C., which can be, for example, 350° C., 400° C., 450° C., 500° C. or 550° C., etc. However, the temperature is not limited to the listed values, and other unlisted values within the numerical range are also applicable.

Preferably, the secondary heating is performed for a period of 1-2 h, which can be, for example, 1 h, 1.2 h, 1.4 h, 1.6 h, 1.8 h or 2 h, etc. However, the period is not limited to the listed values, and other unlisted values within the numerical range are also applicable.

In a second aspect, the present application provides a method for hydrogen production from water photolysis, and the method adopts the device for hydrogen production from water photolysis according to the first aspect;

the method comprises the following steps:

(I) adding a raw material for hydrogen production from water photolysis to the catalytic reaction unit for water photolysis; and (II) reflecting sunlight onto the solar concentrating cone by using the reflector, concentrating sunlight, and projecting sunlight into the catalytic reaction unit for water photolysis to perform a photocatalytic water splitting reaction to obtain a gas product.

As a preferred technical solution of the present application, the raw material for hydrogen production from water photolysis in step (I) comprises water and a catalyst for hydrogen production from water photolysis.

Preferably, in the raw material for hydrogen production from water photolysis in step (I), the catalyst for hydrogen production from water photolysis has a concentration of 1-9000 mg/L, which can be, for example, 1 mg/L, 12 mg/L, 140 mg/L, 1600 mg/L, 8800 mg/L or 9000 mg/L, etc. However, the concentration is not limited to the listed values, and other unlisted values within the numerical range are also applicable.

In the present application, if the concentration of the catalyst for hydrogen production from water photolysis is too low, the photocatalytic efficiency is easily reduced, and if the concentration of the catalyst for hydrogen production from water photolysis is too high, the photocatalytic efficiency is easily reduced.

Preferably, a process of the photocatalytic water splitting reaction in step (II) is accompanied by stirring, and the stirring is performed at a rate of 100-800 rpm, which can be, for example, 100 rpm, 200 rpm, 300 rpm, 400 rpm, 500 rpm, 600 rpm, 700 rpm or 800 rpm, etc. However, the rate is not limited to the listed values, and other unlisted values within the numerical range are also applicable.

The value ranges in the present application comprise not only the above listed point values, but also any unlisted point values within the above value ranges, and for reasons of space and brevity, the specific point values comprised in the ranges will not be listed exhaustively in the present application.

Compared with the prior art, the present application has the following beneficial effects.

(1) In the present application, from the perspective of improving the utilization efficiency of sunlight, a device for hydrogen production from water photolysis is designed, which utilizes the light condenser component to concentrate solar energy in the catalytic reaction unit for water photolysis, greatly improving the light intensity and catalytic efficiency, and greatly simplifying the photocatalytic water splitting interface and reaction unit, and the structure is simple, and the device can be applied to various climates and various light conditions. Moreover, the device can efficiently perform the reaction of hydrogen production and oxygen production with an excellent solar-to-hydrogen conversion efficiency.

(2) The device for hydrogen production from water photolysis provided by the present application has a simple hydrogen production principle and a simple process, the raw materials are easy to be obtained, and the cost is low.

(3) For the device for hydrogen production from water photolysis provided by the present application, the efficiency of hydrogen production from water photolysis can be 30-40 mmol H2h-1g-1 under the condition of concentrating light by 100 times.

Figure 1:
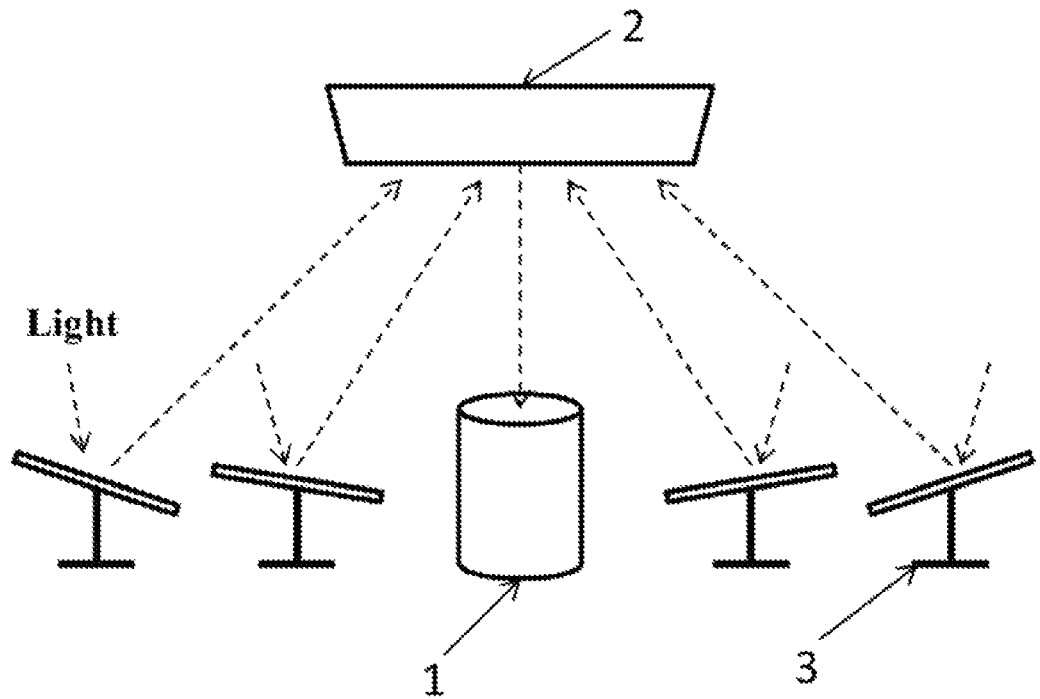
FIG. 1 is a schematic diagram of a device for hydrogen production from water photolysis provided in an embodiment of the present application.

Reference list: 1—catalytic reaction unit for water photolysis, 2—solar concentrating cone, 3—reflector, 4—catalyst for hydrogen production from water photolysis, 5—light-transmitting cover, 6—gas vent, 7—water inlet, 8—water nozzle, 9—stirrer, 10—gas separation device, and 11—water photolysis reactor.

DETAILED DESCRIPTION

It should be understood that, in the description of the present application, the orientation or position relationship indicated by terms, for example, "center", "longitudinal", "lateral", "up", "down", "front", "back", "left", "right", "vertical", "horizontal", "top", "bottom", "inside", "outside", etc., is based on the orientation or position relationship shown in the drawings, which is only intended to facilitate the description of the present application and simplify the description, not to indicate or imply that the device or element referred to must have a particular orientation or must be constructed and operated in a specific orientation, and therefore cannot be understood as a limitation of the present application. In addition, terms such as "first" and "second", are used only for descriptive purposes and cannot be understood as indicating or implying relative importance or implicitly specifying the number of technical features referred to. Thus, features defined by "first" and "second" can explicitly or implicitly comprise one or more of the features. In the description of the present application, unless otherwise stated, "a plurality of" means two or more.

It should be noted that in the description of the present application, unless otherwise expressly specified and limited, the terms such as "arrange", "connect", and "attach" are to be understood in a broad sense, for example, as a fixed connection, or as a detachable connection, or as an integrated connection; as a mechanical connection, or as an electrical connection; as a direct connection, or as an indirect connection via an intermediate medium, or as a communication between two elements. For those skilled in the field, the specific meaning of the above terms can be understood in the light of specific cases in the present application.

The technical solutions of the present application are further explained with reference to the accompanying drawings and embodiments.

Figure 2:
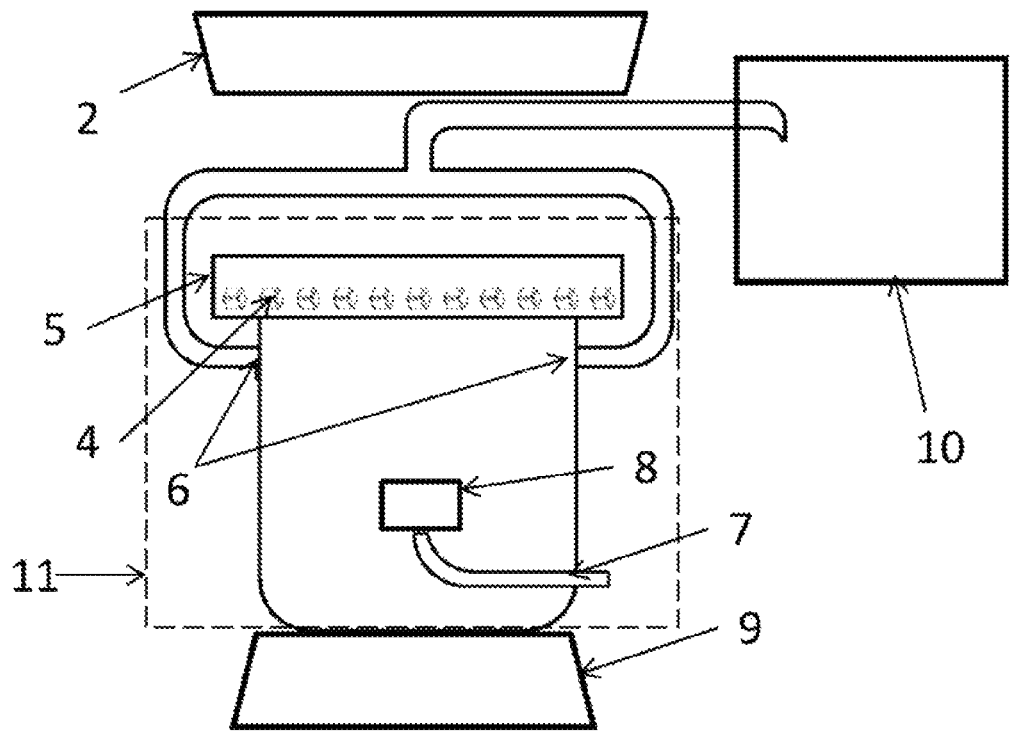
FIG. 2 is a schematic diagram of water photolysis reactor provided in an embodiment of the present application.

In one embodiment, the present application provides a device for hydrogen production from water photolysis, the device for hydrogen production from water photolysis is shown in FIG. 1, and the device for hydrogen production from water photolysis comprises:

a catalytic reaction unit for water photolysis 1 comprising a light-transmitting surface, as shown in FIG. 2, and a light condenser component with a light-concentrating surface facing the light-transmitting surface of the catalytic reaction unit for water photolysis 1; and the light condenser component comprises a solar concentrating cone 2 and reflectors 3 for reflecting and concentrating sunlight into the solar concentrating cone 2.

In the present application, from the perspective of improving the utilization efficiency of sunlight, the device for hydrogen production from water photolysis is designed, which utilizes the light condenser component to concentrate solar energy in the catalytic reaction unit for water photolysis 1, greatly improving the light intensity and catalytic efficiency, and greatly simplifying the catalytic interface and reaction unit for water photolysis, and the structure is simple, and the device can be applied to various climates and various light conditions. Moreover, the reaction for hydrogen production and oxygen production can be efficiently performed by the device, which has an excellent solar-to-hydrogen conversion efficiency.

Those skilled in the field should understand that the catalytic reaction unit for water photolysis 1 comprising a light-transmitting surface in the present application must be provided with a catalyst for hydrogen production from water photolysis, which is used in photocatalytic water splitting for hydrogen production.

Furthermore, the solar concentrating cone 2 is arranged directly above the catalytic reaction unit for water photolysis 1.

In the present application, a distance between the solar concentrating cone and the catalytic reaction unit for water photolysis is not specifically limited, as long as the desired intensity of concentrated light and the catalytic efficiency can be achieved, and the light spot size is consistent with a size of the light-transmitting surface.

Furthermore, the solar concentrating cone 2 comprises a condenser lens.

Furthermore, the reflectors 3 are uniformly arranged around the catalytic reaction unit for water photolysis 1.

Furthermore, the number of the reflectors 3 is 10-100000, which can be, for example, 10, 100, 200, 300, 400, 500, 600, 700, 800, 900, 1000, 1000, 3000, 4000 or 100000, etc. However, the number of the reflectors is not limited to the listed values, and other unlisted values within the numerical range are also applicable.

In the present application, by adding 10-100000 reflectors 3, a light intensity of the concentred sunlight is 10-100000 times the standard solar intensity, greatly improving the light intensity and catalytic efficiency, and greatly simplifying the catalytic interface and reaction unit for water photolysis, which is conducive to efficient hydrogen production.

Furthermore, the catalytic reaction unit for water photolysis 1 comprises a water photolysis reactor 11.

In the present application, an inner wall of the water photolysis reactor 11 is not limited, and exemplarily, the inner wall of the water photolysis reactor 11 can be covered with an aluminum foil; a size of the water photolysis reactor 11 is not limited, exemplarily, which can be a reactor with a light-receiving area of 6×6 cm2, or a reactor with a light-receiving surface having a diameter of 1 m or 2 m.

Furthermore, the water photolysis reactor 11 has an integrated structure, at least one side of inner wall of the water photolysis reactor 11 is embedded with a catalyst for hydrogen production from water photolysis 4, and preferably, a top of the inner wall of the water photolysis reactor 11 is embedded with a catalyst for hydrogen production from water photolysis 4;

alternatively, the water photolysis reactor 11 comprises a container with an opening at the top and a light-transmitting cover 5 arranged at the opening, and at least one side of the inner wall of the container or an inner surface of the light-transmitting cover 5 close to the container is embedded with a catalyst for hydrogen production from water photolysis 4.

Furthermore, a material of the light-transmitting cover 5 is quartz glass.

Furthermore, an outer side wall of the catalytic reaction unit for water photolysis 1 is provided with gas vents 6, a water inlet 7 and a observing port, and the gas vents 6 are higher than the water inlet 7.

Furthermore, the gas vents 6 are connected with a gas separation device 10 by a pipe, and the water inlet 7 is connected with water source by a pipe.

Furthermore, an inside of the catalytic reaction unit for water photolysis 1 is provided with a water nozzle 8 which is connected with the water inlet 7, so that the water is sprayed onto a surface of the light-transmitting cover 5 close to the catalytic reaction unit for water photolysis.

In the present application, an object of spraying water onto the surface of the light-transmitting cover 5 close to the catalytic reaction unit for water photolysis is to utilize the light-transmitting cover loaded with the catalyst, fully improving the light-to-hydrogen conversion efficiency of the reactor.

Furthermore, a stirrer 9 is arranged at the bottom of the catalytic reaction unit for water photolysis 1.

Furthermore, the catalyst for hydrogen production from water photolysis 4 comprises a polyhedral strontium titanate catalyst and/or a polyhedral strontium titanate composite catalyst.

It should be noted that the polyhedral strontium titanate catalyst refers to a pure polyhedral strontium titanate catalyst, which only contains polyhedral strontium titanate without a co-catalyst; the polyhedral strontium titanate composite catalyst is composed of polyhedral strontium titanate and a co-catalyst.

A perovskite-type strontium titanate (SrTiO3) crystal has suitable energy band structure, excellent high-temperature resistance and high ultraviolet absorption efficiency, and has extremely high photon utilization efficiency and photoelectric conversion efficiency in the ultraviolet wavelength band, which is one of the materials for hydrogen production from water photolysis.

Preferably, the polyhedral strontium titanate catalyst comprises an octadecahedron strontium titanate catalyst and/or a polyhedron strontium titanate catalyst having twenty-six faces.

Furthermore, the polyhedral strontium titanate composite catalyst is loaded with an Rh metal compound, a Co metal compound and a Cr metal compound as a co-catalyst.

In the present application, the polyhedral strontium titanate in the polyhedral strontium titanate composite catalyst is loaded with a co-catalyst as an active site, which can further broaden the visible light absorption range, improve the separation efficiency of photogenerated electrons and holes, and improve the efficiency of hydrogen production and oxygen production.

Preferably, the Rh metal compound comprises rhodium chloride, the Co metal compound comprises cobalt nitrate, and the Cr metal compound comprises potassium chromate.

Furthermore, the polyhedral strontium titanate composite catalyst comprises an octadecahedron strontium titanate composite catalyst and/or a polyhedron strontium titanate composite catalyst having twenty-six faces.

In another embodiment, the present application provides a method for hydrogen production from water photolysis, and the method adopts the above device for hydrogen production from water photolysis to perform photocatalytic water splitting for hydrogen production;

the method comprises the following steps:
(I) adding a raw material for hydrogen production from water photolysis to the catalytic reaction unit for water photolysis; and
(II) reflecting sunlight onto the solar concentrating cone by using the reflectors, concentrating sunlight, and projecting sunlight into the catalytic reaction unit for water photolysis 1 to perform a photocatalytic water splitting reaction to obtain a gas product.

Example 1

This example provides a method for hydrogen production from water photolysis, and the method comprises the following steps:
(1) an octadecahedron strontium titanate composite catalyst was prepared, and the specific steps are as follows:
(a) strontium titanate and strontium chloride were mixed at a mass ratio of 1:4, and subjected to heat treatment at 1000° C. for 7.5 h to obtain an octadecahedron strontium titanate catalyst;
(b) the octadecahedron strontium titanate catalyst was dispersed in water to obtain a dispersion solution with a concentration of 0.1 mg/mL, and the dispersion solution and an aqueous solution of rhodium chloride with a concentration of 3 mg/mL were mixed and stirred, and irradiated by a xenon lamp for 7.5 min to obtain a first mixture; an aqueous solution of potassium chromate with a concentration of 3 mg/mL and the first mixture were mixed and stirred, and irradiated by a xenon lamp for 7.5 min to obtain a second mixture; an aqueous solution of cobalt nitrate with a concentration of 3 mg/mL and the second mixture were mixed and stirred, and irradiated by a xenon lamp for 7.5 min to obtain a third mixture; the third mixture was heated in a water bath at 90° C., and then heated in an air atmosphere at 450° C. for 1.5 h to obtain the octadecahedron strontium titanate composite catalyst;
wherein a volume ratio of the aqueous solution of rhodium chloride, the aqueous solution of potassium chromate and the aqueous solution of cobalt nitrate was 30:15:15;
(2) water and the octadecahedron strontium titanate composite catalyst were added to a water photolysis reactor, and continuously stirred by using a stirrer at a rate of 500 rpm;
wherein a concentration of the octadecahedron strontium titanate composite catalyst was 1.5 mg/mL; and
(3) sunlight was reflected onto a solar concentrating cone by using 500 reflectors, and concentrated and projected into the water photolysis reactor to perform a photocatalytic water splitting reaction to obtain a gas product.

Example 2

This example provides a method for hydrogen production from water photolysis, and the method comprises the following steps:
(1) a polyhedron strontium titanate composite catalyst having twenty-six faces was prepared, and the specific steps are as follows:
(a) strontium titanate and strontium bromide were mixed at a mass ratio of 1:2, and subjected to heat treatment at 800° C. for 10 h to obtain a polyhedron strontium titanate catalyst having twenty-six faces; and
(b) the polyhedron strontium titanate catalyst having twenty-six faces was dispersed in water to obtain a dispersion solution with a concentration of 0.05 mg/mL, the dispersion solution and an aqueous solution of rhodium chloride with a concentration of 2 mg/mL were mixed and stirred, and irradiated by a xenon lamp for 5 min to obtain a first mixture; an aqueous solution of potassium chromate with a concentration of 2 mg/mL and the first mixture were mixed and stirred, and irradiated by a xenon lamp for 5 min to obtain a second mixture; an aqueous solution of cobalt nitrate with a concentration of 2 mg/mL and the second mixture were mixed and stirred, and irradiated by a xenon lamp for 5 min to obtain a third mixture; the third mixture was heated in a water bath at 90° C., and then heated in an air atmosphere at 350° C. for 2 h to obtain the polyhedron strontium titanate composite catalyst having twenty-six faces;
wherein a volume ratio of the aqueous solution of rhodium chloride, the aqueous solution of potassium chromate and the aqueous solution of cobalt nitrate was 10:20:20;
(2) water and the polyhedron strontium titanate composite catalyst having twenty-six faces were added to a water photolysis reactor, and continuously stirred by using a stirrer at a speed of 100 rpm;
wherein a concentration of the polyhedron strontium titanate composite catalyst having twenty-six faces was 2 mg/mL; and
(3) sunlight was reflected onto a solar concentrating cone by using 1000 reflectors, and concentrated and projected into the water photolysis reactor to perform a photocatalytic water splitting reaction to obtain a gas product.

Example 3

This example provides a method for hydrogen production from water photolysis, and the method comprises the following steps:
(1) an octadecahedron strontium titanate composite catalyst was prepared, and the specific steps are as follows:
(a) strontium titanate and strontium iodide were mixed at a mass ratio of 1:6, and subjected to heat treatment at 1200° C. for 5 h to obtain an octadecahedron strontium titanate catalyst;
(b) the octadecahedron strontium titanate catalyst was dispersed in water to obtain a dispersion solution with a concentration of 0.15 mg/mL, the dispersion solution and an aqueous solution of rhodium chloride with a concentration of 4 mg/mL were mixed and stirred, and irradiated by a xenon lamp for 10 min to obtain a first mixture; an aqueous solution of potassium chromate with a concentration of 4 mg/mL and the first mixture were mixed and stirred, and irradiated by a xenon lamp for 10 min to obtain a second mixture; an aqueous solution of cobalt nitrate with a concentration of 4 mg/mL and the second mixture were mixed and stirred, and irradiated by a xenon lamp for 10 min to obtain a third mixture; the third mixture was heated in a water bath at 90° C., and then heated in an air atmosphere at 550° C. for 1 h to obtain the octadecahedron strontium titanate composite catalyst;
wherein a volume ratio of the aqueous solution of rhodium chloride, the aqueous solution of potassium chromate and the aqueous solution of cobalt nitrate was 50:10:10;
(2) water and the octadecahedron strontium titanate composite catalyst were added to a water photolysis reactor, and continuously stirred by using a stirrer at a rate of 800 rpm;
wherein a concentration of the octadecahedron strontium titanate composite catalyst was 1 mg/mL; and
(3) sunlight was reflected onto the solar concentrating cone by using 100 reflectors, and concentrated and projected into the water photolysis reactor to perform a photocatalytic water splitting reaction to obtain a gas product.

Example 4

The difference between this example and Example 1 is that the catalyst for hydrogen production from water photolysis in this example was an octadecahedron strontium titanate catalyst, i.e., step (b) was not performed.

The rest of preparation method and parameters are consistent with Example 1.

Example 5

The difference between this example and Example 1 is that the concentration of the octadecahedron strontium titanate composite catalyst in step (2) was 0.5 mg/mL.

The rest of preparation method and parameters are consistent with Example 1.

Example 6

The difference between this example and Example 1 is that the concentration of the octadecahedron strontium titanate composite catalyst in step (2) was 2.5 mg/mL.

The rest of preparation method and parameters are consistent with Example 1.

Example 7

The difference between this example and Example 1 is that, in this example, the inner wall of the water photolysis reactor was not embedded with the octadecahedron strontium titanate composite catalyst.

The rest of preparation method and parameters are consistent with Example 1.

Example 8

The difference between this example and Example 1 is that the solar concentrating cone in this example was arranged at the upper left of the water photolysis reactor.

The rest of preparation method and parameters are consistent with Example 1.

Example 9

The difference between this example and Example 1 is that the solar concentrating cone in this example was arranged at the upper right of the water photolysis reactor.

The rest of preparation method and parameters are consistent with Example 1.

Comparative Example 1

The difference between this comparative example and Example 1 is that the light condenser component did not contain a reflector.

The rest of preparation method and parameters are consistent with Example 1.

Comparative Example 2

The difference between this comparative example and Example 1 is that the light condenser component was replaced with a condenser lens.

The rest of preparation method and parameters are consistent with Example 1.

Performance Test

TABLE 1

| | Efficiency of catalyst for hydrogen production from water photolysis (mmol $H_2 h^{-1} g^{-1}$) |
|---|---|
| Example 1 | 240 |
| Example 2 | 380 |
| Example 3 | 30 |
| Example 4 | 30 |
| Example 5 | 130 |
| Example 6 | 110 |
| Example 7 | 200 |
| Example 8 | 60 |
| Example 9 | 60 |
| Comparative Example 1 | 0.1 |
| Comparative Example 2 | 0.3 |

Analysis:

As can be seen from the above table, the device for hydrogen production from water photolysis designed in the present application greatly improves the light intensity and catalytic efficiency, and also greatly simplifies the catalytic interface and reaction unit for water photolysis, and by combining the device with the catalyst for hydrogen production from water photolysis to perform the reaction for hydrogen and oxygen production, the solar-to-hydrogen conversion efficiency has been significantly improved, showing a good development prospect.

From the data comparison of Example 1 and Example 4, it can be seen that if the octadecahedron strontium titanate catalyst is adopted, the efficiency of hydrogen production is only 12.5% of the efficiency of hydrogen production of the octadecahedron strontium titanate composite catalyst.

From the data comparison of Example 1 and Examples 5-6, it can be seen that if the concentration of the octadecahedron strontium titanate composite catalyst is too low, the co-catalyst on strontium titanate surface is accordingly too low in content, and the efficiency of hydrogen production is significantly reduced; if the concentration of the octadecahedron strontium titanate composite catalyst is too high, the co-catalyst on strontium titanate surface is accordingly too high in content, and the efficiency of hydrogen production is significantly reduced.

From the data comparison of Example 1 and Example 7, it can be seen that if the inner wall of the water photolysis reactor is not embedded with the octadecahedron strontium titanate composite catalyst, the efficiency of hydrogen production is reduced by 17%.

From the data comparison of Example 1 and Examples 8-9, it can be seen that if the solar condenser is not arranged directly above the water photolysis reactor, the efficiency of hydrogen production is reduced by 75%.

From the data comparison of Example 1 and Comparative Example 1, it can be seen that if the light condenser component does not contain a reflector, the sunlight received by the reactor is only or even less than a standard solar irradiance, and the penetration ability of sunlight is poor, resulting in the extremely low efficiency of hydrogen production.

From the data comparison of Example 1 and Comparative Example 2, it can be seen that if the light condenser component is replaced with a condenser lens, the sunlight received by the reactor is only a standard solar irradiance, and the penetration ability of sunlight is poor, resulting in the extremely low efficiency of hydrogen production.

The applicant declares that the process methods of the present application are illustrated by the above examples in the present application, but the present application is not limited to the above process methods, that is, the present application does not necessarily rely on the above process methods to be implemented. Those skilled in the field should understand that any improvement of the present application, the equivalent substitution of raw materials, the addition of auxiliary operations, and the selection of specific methods in the present application shall fall within the protection and disclosure scope of the present application.

What is claimed is:

1. A method for hydrogen production from water photolysis, wherein the method adopts a device for hydrogen production from water photolysis comprising:
    a catalytic reaction unit for water photolysis comprising a light-transmitting surface, and a light condenser component with a light-concentrating surface facing the light-transmitting surface of the catalytic reaction unit for water photolysis;
    the light condenser component comprises a solar concentrating cone and a reflector for reflecting and concentrating sunlight into the solar concentrating cone;
    the catalytic reaction unit for water photolysis comprises a water photolysis reactor;
    the water photolysis reactor comprises a container with an opening at the top and a light-transmitting cover arranged at the opening, and at least one side of inner wall of the container or an inner surface of the light-transmitting cover close to the container is embedded with a catalyst for hydrogen production from water photolysis;
    the catalyst for hydrogen production from water photolysis comprises a polyhedral strontium titanate catalyst and/or a polyhedral strontium titanate composite catalyst;
    the polyhedral strontium titanate catalyst comprises an octadecahedron strontium titanate catalyst and/or a polyhedron strontium titanate catalyst having twenty-six faces;
    a preparation method for the octadecahedron strontium titanate catalyst comprises: mixing strontium titanate and strontium iodide with a mass ratio of 1:6, and performing heat treatment at 1200° C. for 5 h to obtain the octadecahedron strontium titanate catalyst;
    a preparation method for the polyhedron strontium titanate catalyst having twenty-six faces comprises: mixing strontium titanate and strontium bromide with a mass ratio of 1:2, and performing heat treatment at 800° C. for 10 h to obtain the polyhedron strontium titanate catalyst having twenty-six faces;
    the method for hydrogen production from water photolysis comprises the following steps:
    (I) adding raw materials for hydrogen production from water photolysis to the catalytic reaction unit for water photolysis; and
    (II) reflecting sunlight onto the solar concentrating cone by using the reflector, concentrating sunlight, and projecting sunlight into the catalytic reaction unit for water photolysis to perform a photocatalytic water splitting reaction to obtain a gas product;
    the raw materials for hydrogen production from water photolysis in step (I) comprise water and a catalyst for hydrogen production from water photolysis;
    in the raw materials for hydrogen production from water photolysis in step (I), a concentration of the catalyst for hydrogen production from water photolysis is any one of 1 mg/L, 1.5 mg/L or 2 mg/L.

2. The method according to claim 1, wherein the solar concentrating cone is arranged directly above the catalytic reaction unit for water photolysis;
    the solar concentrating cone comprises a condenser lens.

3. The method according to claim 1, wherein reflectors are uniformly arranged around the catalytic reaction unit for water photolysis;
    the number of the reflectors is 10-100000.

4. The method according to claim 1, wherein
    a material of the light-transmitting cover is quartz glass.

5. The method according to claim 1, wherein an outer side wall of the catalytic reaction unit for water photolysis is provided with a gas vent, a water inlet and a observing port, and the gas vent is higher than the water inlet;
    the gas vent is connected with a gas separation device by a pipe, and the water inlet is connected with a water source by a pipe.

6. The method according to claim 5, wherein an inside of the catalytic reaction unit for water photolysis is provided with a water nozzle which is connected with the water inlet, whereby the water is sprayed onto a surface of the light-transmitting cover close to the catalytic reaction unit for water photolysis.

7. The method according to claim 1, wherein a stirrer is arranged at the bottom of the catalytic reaction unit for water photolysis.

8. The method according to claim 1, wherein
    the polyhedral strontium titanate composite catalyst is loaded with an Rh metal compound, a Co metal compound and a Cr metal compound as co-catalyst.

9. The method according to claim 1, wherein
    a process of the photocatalytic water splitting reaction in step (II) is accompanied by stirring, and the stirring is performed at a rate of 100-800 rpm.

* * * * *